United States Patent
Maynar et al.

(10) Patent No.: US 8,069,965 B2
(45) Date of Patent: Dec. 6, 2011

(54) SECTION INSULATOR FOR A RIGID CATENARY

(75) Inventors: Manuel Melis Maynar, Madrid (ES); Ildefonso De Matias Jimenez, Madrid (ES); Francisco Javier Gonzalez Fernandez, Madrid (ES); Miguel Alejandro Moya Lopez-Duque, Madrid (ES); Rogelio Sanchez Pardias, Madrid (ES); Jorge Francisco Blanquer Jaraiz, Madrid (ES); Felipe Carmona Pinto, Madrid (ES); Carlos Vera Alvarez, Madrid (ES); Maria Carmen Borbano Sánchez, legal representative, Madrid (ES); Berta Suarez Esteban, Madrid (ES); Jennifer Paulin, Madrid (ES)

(73) Assignee: Metro de Madrid, S.A., Madrid (ES)

( * ) Notice: Subject to any disclaimer, the term of this patent is extended or adjusted under 35 U.S.C. 154(b) by 295 days.

(21) Appl. No.: 12/089,521

(22) PCT Filed: Aug. 14, 2006

(86) PCT No.: PCT/ES2006/000477
§ 371 (c)(1),
(2), (4) Date: Oct. 26, 2009

(87) PCT Pub. No.: WO2007/045701
PCT Pub. Date: Apr. 26, 2007

(65) Prior Publication Data
US 2010/0133055 A1    Jun. 3, 2010

(30) Foreign Application Priority Data
Oct. 6, 2005    (ES) .................................. 200502429

(51) Int. Cl.
*B60M 1/18*    (2006.01)

(52) U.S. Cl. .......................................... 191/39; 191/22 R
(58) Field of Classification Search .................... 191/39, 191/22 R, 29 R, 40, 41, 42
See application file for complete search history.

(56) References Cited

U.S. PATENT DOCUMENTS

| | | | | |
|---|---|---|---|---|
| 4,029,182 A | * | 6/1977 | Proud | 191/39 |
| 4,406,930 A | * | 9/1983 | Menhorn et al. | 191/39 |
| 4,424,889 A | * | 1/1984 | Hockele et al. | 191/39 |
| 4,572,929 A | * | 2/1986 | Nitschke et al. | 191/29 R |
| 4,716,261 A | * | 12/1987 | Wehrberger et al. | 191/39 |

(Continued)

FOREIGN PATENT DOCUMENTS
EP    0052176 A1    5/1982

(Continued)

*Primary Examiner* — Joe Morano, IV
*Assistant Examiner* — Jason C Smith
(74) *Attorney, Agent, or Firm* — Knobbe Martens Olson & Bear, LLP

(57) ABSTRACT

Section insulator for rigid catenary which has a dual functionality, since it can exercise the functions both of conventional section insulator and of neutral section insulator, configured so that it maintains a mechanical continuity which allows the smooth passage of the pantograph, minimizing the requirement for adjustment and maintenance. The insulator basically comprises a pair of conductor rail segments (2) between which is disposed a single central shoe (1) obliquely disposed with respect to the direction of the catenary, a pair of spark wires (9) wherein the electric field is broken and a series of strips (8) disposed on said central shoe (1) which, together with a bridging cable which extends from them to the conductor rail segment (2), enables bridging the wire conductor of the insulator (3) when one want to maintain the power supply to the pantograph.

3 Claims, 4 Drawing Sheets

U.S. PATENT DOCUMENTS

| | | | | |
|---|---|---|---|---|
| 5,810,137 | A | * | 9/1998 | White .............................. 191/39 |
| 5,865,282 | A | * | 2/1999 | Gluck ..................... 191/22 DM |
| 6,206,156 | B1 | * | 3/2001 | Nunlist ....................... 191/22 R |
| 7,552,807 | B2 | * | 6/2009 | Shrubsall et al. ............... 191/39 |
| 7,740,117 | B2 | * | 6/2010 | Bointon et al. ................. 191/39 |
| 2009/0223766 | A1 | * | 9/2009 | Bointon et al. ................. 191/39 |
| 2010/0133055 | A1 | * | 6/2010 | Melis Maynar et al. ........ 191/39 |

FOREIGN PATENT DOCUMENTS

| | | |
|---|---|---|
| EP | 0592819 A1 | 4/1994 |
| WO | WO 99/03700 A1 | 1/1999 |

* cited by examiner

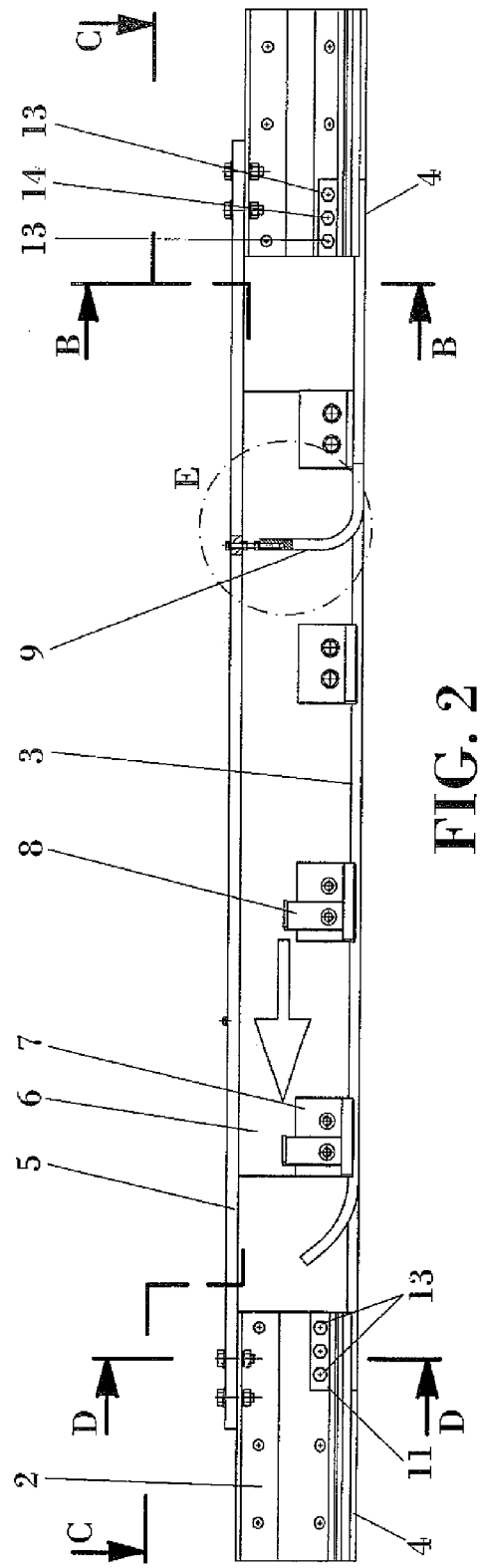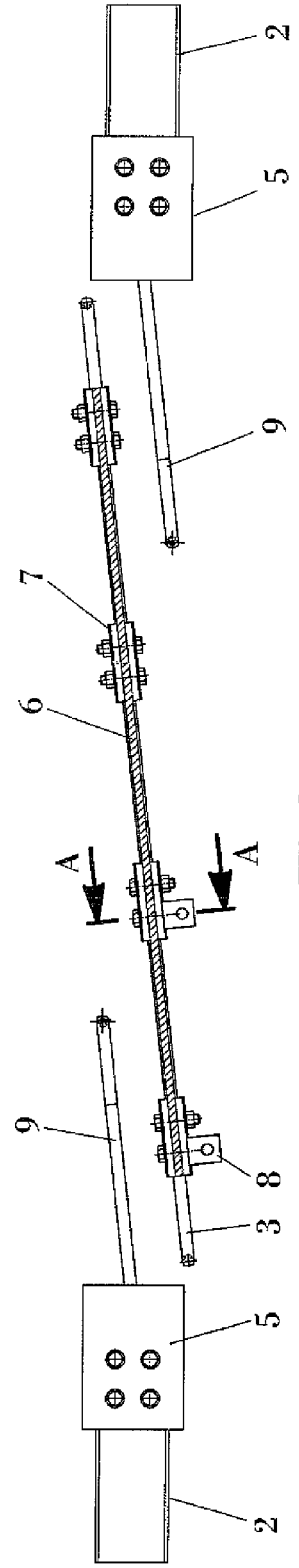
FIG. 2
FIG. 3
C-C

B-B

A-A

D-D

E

SECTION INSULATOR FOR A RIGID CATENARY

CROSS-REFERENCE TO RELATED APPLICATIONS

This application is a U.S. National Phase of International Application No. PCT/ES2006/000477, filed Aug. 14, 2006, designating the U.S. and published on Apr. 26, 2007 as WO 2007/045701, which claims priority to Spanish Patent Application No. P200502429. The content of these applications are incorporated herein by reference in their entireties.

DESCRIPTION

Object of the Invention

The present invention relates to a section insulator developed to be installed in electrified railway lines, specifically in those wherein the catenary which supplies electric voltage to the pantograph is a rigid catenary.

The section insulator for rigid catenary object of this invention has a dual functionality, since it can exercise the functions both of conventional section insulator and of neutral section insulator.

BACKGROUND OF THE INVENTION

The rigid catenary is a power system for rail transport alternative to the conventional catenary and which basically consists of an aluminium profile with an area in the form of a gripping device which serves as housing to the copper contact wire whereby it makes contact with the pantograph table positioned in the locomotor roof, thereby capturing the line current.

Despite the fact that its lower maintenance costs compared with conventional catenaries justify its installation in any part of the line, its use is normally almost exclusively restricted to the inside of tunnels since it reduces the gauge necessary therein. The fact that this electrification system is not widely used justifies that most of the section insulators are designed to be adapted to conventional catenaries and not rigid catenaries.

The overhead contact lines installed to supply electricity to the railway lines are subdivided in different sections or electric circuits to thus guarantee its operating availability. This sectioned design of the electrical installation enables the insulation of each of the sections independently, so that the power supply can be interrupted without having to cut the current supply to the entire installation. In this way, in the event that a fault occurs in one or several sections comprising the line (either the service is interrupted in a planned manner to perform periodic maintenance work or repair in the event of fault) the power supply is guaranteed, and therefore the operation of those sections that are not affected by said circumstances, thus avoiding the interruption of the rail traffic throughout the line.

To achieve this purpose, the aforementioned section insulators are used, which consist of insulating elements which, positioned between two adjacent sections of overhead contact line, interrupt the electrical continuity between said sections although they guarantee the mechanical continuity between both, thus allowing the passage of the pantographs. The section insulators should maintain the electric voltage in the pantograph, guaranteeing that the protection devices of the rolling stock are not affected nor are operating malfunctions created therein, thus avoiding the unnecessary triggering of the protection apparatus. Therefore, the configuration of said section insulators should be such that it permits the pantograph to come into contact with one of the ends of the insulator before losing contact with the other end. The most typical solutions in the state of the art consist of disposing two shoes which guarantee the continuity of the current at the time of passage through the insulator or splitting the contact wire in two, thus establishing a common contact area.

To electrically separate two adjacent sections of the overhead line supplied from two different substations the so-called neutral sections are interposed between said sections. The interposition of these sections enables separating sections between which there is a power difference, in the case of DC, or even a phase difference in the event that the feed current of the catenary is AC. The application is even known of neutral sections of considerable length in transition areas between the supply of DC and AC current, thus making a light rail system compatible with the metro system or even the network of regional trains. In classic designs, the neutral section is defined by the intermediate space, insulated or earthed, which is created between two section insulators or two air gap insulations.

As in the case of the section insulators, the neutral sections, aside from electrically insulating the two sections between which they are installed, must guarantee the mechanical continuity between both so that they enable the smooth passage of the pantograph. Nevertheless, unlike what occurs in the case of conventional section insulators, when the pantograph traverses the neutral section, the electrical derivations between the sections that said neutral section separates must be avoided. For this reason, to reduce the appearance of electric arcs, some systems use track magnets which automatically disconnect the power of the rolling stock when this approximates the neutral section, re-establishing the power immediately after crossing it, for which reason it incorporates a second set of magnets of a function programmed for "time out" in the system which controls the traction of the train or electric traction vehicle concerned.

Despite the fact that, as has been indicated, the rigid catenary is an electrification system which is not widely used and, therefore, most of the existing insulator designs do not adapt to this type of overhead line, there are some appropriate designs for its installation in this type of catenary.

Thus, for example, an insulator assembly can be found in the state of the art applicable to rigid catenaries which is inserted between two conductor rail bars, the ends of said insulator having the same profile as the conductor rail wherein it is inserted. The central part of the insulator is made of a material of great dielectric and mechanical rigidity, so that it complies with the requirements of this type of device: on the one hand, it interrupts the electrical continuity between the two conductor rail bars and further guarantees the mechanical continuity between both, permitting the passage of the pantographs. Shoes are mounted on each side of the insulator, in longitudinal direction, which receive the passage of the pantograph, the central part remaining at an upper level, for which reason the pantograph only rests on the side shoes and not on said central part.

The previous insulator assembly has the advantage that compared with other known insulators it can act as both section insulator and neutral section insulator by doing no more than establishing the appropriate electrical connections in each case. For this purpose, the insulator has copper strips which allow making bridging connections, so that the side shoes remain electrified, thus guaranteeing the power supply to the pantograph during its passage through the insulator. However, when the operating requirements demand the existence of a neutral zone, the bridging cables are removed and in this way, the side shoes are not electrified, so that the pantograph stops being electrically supplied on passing through the central zone which, on being electrically insulated, starts to behave as a neutral area. This functionality, however, obliges introducing a great separation between the side shoes in order to main the necessary safety distances to guarantee the electrical insulation between the different components.

Among this device's deficiencies, and which the insulator object of this invention tries to resolve, we should highlight the difference between the mechanical properties of the rigid catenary and the section insulator, which causes a discontinuity in the vertical rigidity of the system which leads to the appearance of hard points, with the consequent deterioration of the current capturing quality when configured as section insulator.

On the other hand, an undesirable behaviour of this type of section insulator has been observed in combination with pantographs which have a non-uniform wear of the collecting shoes, a phenomenon which is closely linked to the distance between the side shoes already mentioned. On passing through the insulator, the pantograph first rests on the contact wire inserted in the conductor rail profiles positioned at the ends and later in the side shoes of the central zone, which are found at the same height as said wire. On passing through the intermediate zone, wherein the three wires overlap, if the pantograph table is new or has uniform wear, the support is produced correctly and, therefore, the insulator's behaviour is that desired. However, on the occasions wherein the collecting shoe of the pantograph has a high degree of irregular wear, said wear being greater in the central area, there is a high risk of a collision of the sides of the table with the side shoes of the insulator. Sudden bumps against the shoes produce the breaking thereof and, furthermore, as a consequence of the bump, contact losses may occur with the central wire, increasing the wear caused by the appearance of electric arcs.

To avoid these bumps insofar as is possible, it is necessary to adjust the height of the shoes acting on the vertical studs which support them, thus avoiding the collision of the pantograph with the side shoes, even in the case that the pantograph in question has the table worn. Despite the fact that this solution is very simple, it is not of practical use, since logically, the wear of the table of each one of the pantographs which traverse the insulator will considerably vary from one to another, which means it would be necessary to adjust the height of the shoes prior to the passage of each vehicle, which is absolutely infeasible. However, this solution causes a geometric continuity in the height of the different elements of the section insulator, in addition to requiring frequent maintenance operations.

In light of the above, the objective of the present invention is to develop an insulator for rigid catenary which performs the dual function of section insulator, interrupting the electrical continuity between the sections when necessary, and neutral section, guaranteeing in both cases sufficient mechanical continuity between the catenary and the insulator to permit the smooth passage of the pantograph. It is likewise desirable that the insulator in question overcomes the drawbacks of the similar known devices, which means that their configuration should be such that it minimizes the need for adjustment and maintenance and has, insofar as is possible, similar mechanical properties to those of the rigid catenary wherein it is installed.

DESCRIPTION OF THE INVENTION

The invention consists of a section insulator for rigid catenary which has a dual functionality since it can exercise the functions both of conventional section insulator and neutral section insulator. In other words, the object of this invention is an insulating element which, positioned between two adjacent sections of the rigid catenary, interrupts the electrical continuity between them, separating them electrically when required, nevertheless maintaining a mechanical continuity such that it allows the smooth passage of the pantograph.

In order to guarantee that the transition of the pantograph through the insulator is easily produced, i.e. without bumps and uniformly, the insulator described below adapts to the geometric and mechanical characteristics, i.e. linear weight or vertical rigidity, of the conductor rail of the rigid catenary wherein it is installed.

Compared with the insulators known at present, which as has been previously seen normally comprise two side shoes which extend parallel to the direction of the catenary, the insulator which is being described comprises a single shoe obliquely disposed with respect to the direction of the catenary, thus guaranteeing the symmetry of the assembly. This characteristic configuration of the insulator permits a much more compact design to be obtained which considerably reduces the sudden bumps between the collecting shoe of the pantograph and the shoe of the section insulator, which thus minimizes the need for adjustment and maintenance. Another added advantage, consequence of the insulator's configuration, is that it reduces the wear of both the wire and the pantograph table, which leads to a reduction in the maintenance operations and, consequently, to an economic saving.

The main element of the insulator being described is the aforementioned shoe, which is disposed between two conductor rail segments. Said segments join to the ends of each section of the catenary by connection flanges similar to those used to join the aluminium bars which compose the rigid catenary. These segments have identical properties to those of the rigid catenary wherein the insulator is installed, since they have the same configuration, i.e. the same profile, and they are normally made in the same material. In this way, it achieves that both the linear weight and the vertical rigidity of said segments are similar to those of the conductor rail. The similarity in the configuration of the segments and in the conductor rail of the catenary further guarantees the continuity of the contact wire between the section insulator and the rigid catenary, since said wire extends throughout each one of the segments.

The insulator shoe comprises an insulating piece whose base rests on both ends of the insulator, i.e. on the upper part of the previous conductor rail segments, a core disposed in direction vertical, so that the insulating piece has T-shaped cross-section, and a wire conductor, hereinafter called insulator wire and normally copper, disposed on the lower part of said core. The base of the insulating piece is oriented in the same direction as the two segments whereon it rests, thus giving continuity to the catenary, although the core of this insulating piece, and consequently the insulator wire fixed on its lower part, are obliquely disposed with respect to said direction. The fixing of the insulator wire to the core of the insulating piece is performed through pieces, called clamps, disposed on said core, as will be seen in detail below. The insulator wire, which is the element which acts as shoe, extends beyond the length of the core of the insulating piece, its two ends being outside said core and curved upwards.

To guarantee the correct breaking of the electric arc when abandoning the first section, preformed copper wires called sparks are added to the ends of each one of the conductor rail segments. The introduction of these elements has the purpose that the electric arc breaks in them and, therefore, these sparks will be the elements which undergo most wear of the section insulator. To facilitate the replacement of said elements, the incorporation of an opening mechanism has been considered which permits replacing them quickly and simply. Said opening mechanisms are disposed at the ends of each one of the two conductor rail segments, which remain opposite the shoe of the section insulator.

In order to adjust the behaviour of the insulator, allowing it to electrically supply the pantograph or behave as a neutral section, connecting strips of conductor material have been incorporated, normally, copper, which allow the bridging of the central shoe by a bridging cable, normally also copper. This cable is fixed, by one of its ends, to one of said connecting strips, whilst the other end is fixed to a bore made for said purpose in the end of the insulator or to a connecting clamp or similar positioned in the upper part of the adjacent rigid catenary.

In principle, the connecting strips can be placed at any of the two ends of the insulator equally, i.e. both at its entry and at its exit. However, if said strips were fixed to the insulator exit, the breakage of the electric arc will occur at the ends of the central shoe, whilst its installation at the entry of the insulator is more advantageous since the electric arc breaks in copper wires previously called sparks, which, as has been advanced, can easily be replaced as they are pieces of short length fixed at the end of the insulator by different opening mechanisms. For this reason, the strips are installed at the entry of the insulator and not at its exit.

When the insulator is bridged, i.e. a bridging wire is installed between one of its ends and a connecting strip, the distance between the electrically insulated conductor elements, i.e. the central shoe and the output spark, is less than the width of the pantograph table, for which reason its power supply is ensured at all times since, before the table loses contact with the insulator wire, it is already in contact with the output spark, which is subjected to the corresponding supply voltage.

However, when the insulator is not bridged, the insulator shoe lacks electric voltage, for which reason the distance between the electrically insulated conductor elements, i.e. between the input spark and the output spark, is greater than the width of the pantograph table, which means this lacks power supply during its passage through the insulator, which in this situation behaves as a neutral section.

The spark wires are fixed, by one of their ends, to each one of the two conductor rail segments between which the central shoe extends, whilst their free end rests directly on the base of the insulating piece of the central shoe in order to avoid undesired vertical movements. In order to permit an easy adjustment of the spark height, thus guaranteeing the smooth passage of the pantograph and allowing height differences to be compensated due to the wear of said elements, the incorporation of a height adjustment system has been considered, which comprises, among other elements which will be detailed below, a bolt which extends from the base of the insulating piece and the lower end whereof is introduced in the free end of the spark.

DESCRIPTION OF THE DRAWINGS

To complement the description being made and with the object of helping towards a better understanding of the characteristics of the invention, in accordance with a preferred example of practical embodiment thereof, a set of figures is attached as an integral part of the description, wherein the following has been represented with an illustrative non-limitative character:

FIG. 2. Shows an elevation view of the section insulator of FIG. 1.

FIG. 3. Shows the section produced by the C-C plane of FIG. 2.

PREFERRED EMBODIMENT OF THE INVENTION

In light of the figures, we can observe therein an example of embodiment of the invention, which consists of a section insulator for rigid catenary which basically comprises two conductor rail segments (2), with their corresponding sparks (9) and the opening mechanisms to facilitate their replacement, and a central shoe (1) obliquely disposed between both segments (2), and which can be bridged at convenience, as will be seen below.

Figure 1:
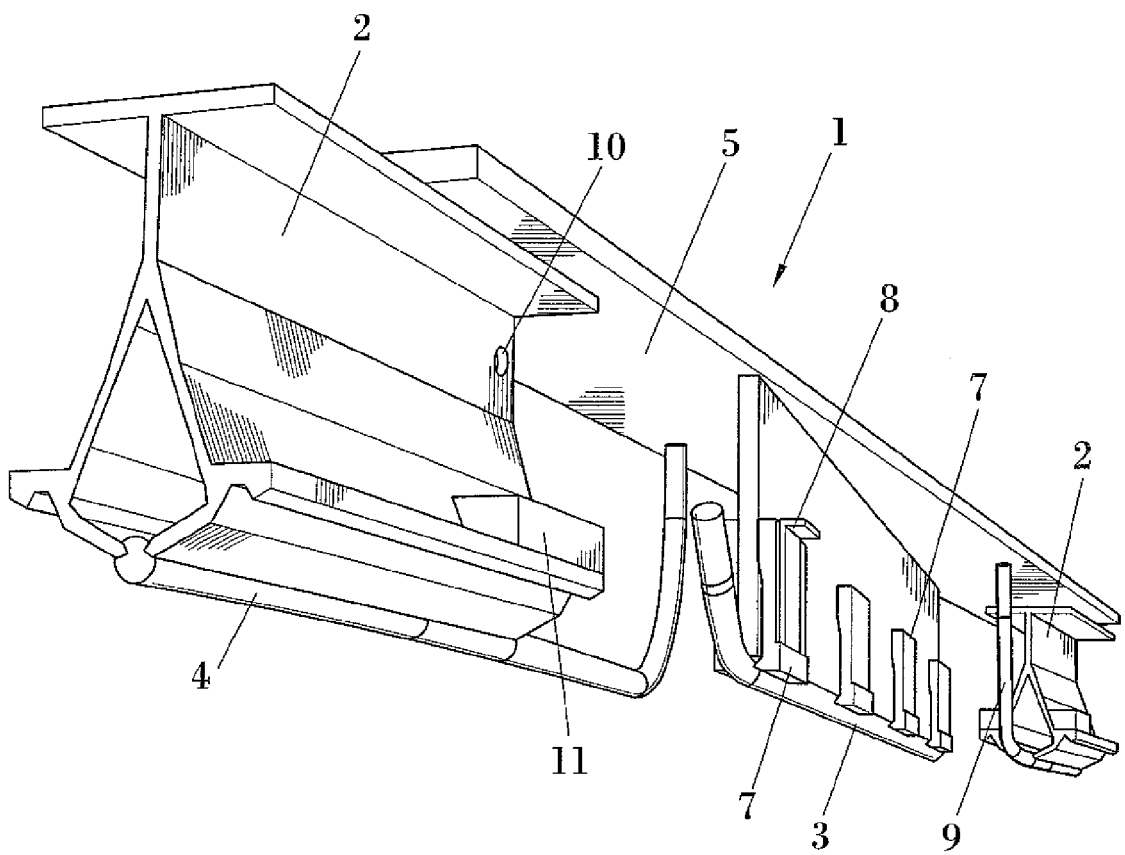
FIG. 1. Shows a perspective view of the section insulator for rigid catenary object of this invention.

FIG. 1 shows a perspective view of the section insulator which is being described, and therein we can clearly observe how the central shoe (1) is disposed between two conductor rail segments (2), consisting of an aluminium profile at the lower end whereof a contact wire (4) of the rigid catenary is secured. The physical constitution of the insulator is also clearly shown in FIG. 2, which corresponds to an elevation view of the previous figure. The profile of both segments (2) exactly corresponds to the conductor rail comprising the rest of the catenary, for which reason said segments (2) have the same properties as the catenary, whereto they are joined by connection flanges. In the figures that comprise this description, and with the object of simplifying them insofar as is possible, the section insulator has exclusively been represented and not the conductor rails of the catenary wherein it is installed and, therefore, the connection flanges neither.

Since the profile of said segments (2) is the same as that which constitutes the conductor rail of the catenary, the contact wire (4) is fixed to the segments (2), as in the rest of the catenary, by insertion of the wire (4) in the housing determined by the two lower ends of said profile. Despite the fact that in this description, and in the accompanying figures, reference is made to a determined conductor rail profile, it includes the possibility that the insulator described adapts to any rigid catenary, whereby the profile of the segments (2) comprising said insulator will be the same as that of the catenary in question.

As has previously been mentioned, and with the object of guaranteeing the correct breakage of the electric arc when abandoning the first section, each one of the conductor rail segments (2) incorporates a preformed copper wire called sparks (9). The spark wires (9) are disposed, as with the contact wire (4), in the lower part of the profile in question, positioning one of the ends of said sparks (9) adjacent with respect to the contact wire (4), i.e. the wire comprising each one of the two sparks (9) is the extension of the contact wire (4), with respect to which it extends obliquely. The oblique arrangement of the two spark wires (9) is observed more clearly in FIG. 3, wherein it is observed how both wires (9) extend parallel to one another and with respect to the core (6) of the insulating piece.

One of the ends of each spark wire (9) is fixed to the corresponding conductor rail segment (2) by an opening mechanism, whose constitution is observed in FIG. 6, which will be seen below, which allows them to be replaced more quickly and simply. The opposite end of the sparks (9), which, from the height corresponding to that of the contact wire (4) of the catenary, describe a curved path until reaching the base (5) of the insulating piece, is fixed by means of a height adjustment system to said base (5), so that undesired vertical movements are avoided.

Figure 7:
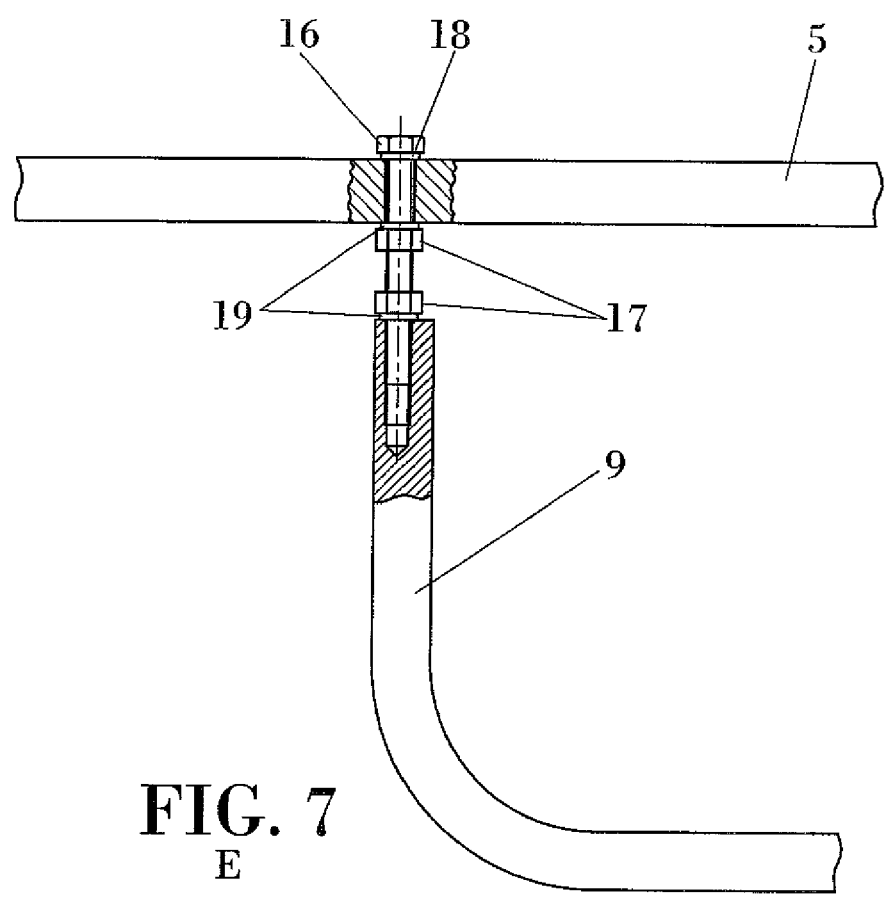
FIG. 7. Shows a view of the detail indicated as E in FIG. 2 and corresponds to the height adjustment system of the spark wires.

FIG. 7 shows said adjustment system in detail, which basically comprises a bolt (16), two hold-down nuts (17) and several washers (18, 19). The stem of the bolt (16) traverses the base (5) of the insulating piece and is introduced in the spark wire (9), its head remaining on the upper surface of said base (5) and its lower end housed in said wire (9). In order to immobilize the bolt (16), a washer (18) is interposed between its head and the upper surface of the base (5) of the insulating piece, which, additionally, increases the support area bolt (16) head and avoids scratching the base (5). Two hold-down nuts (17) are threaded to the stem of the previous bolt (16), one of them opposite the lower surface of the base (5) of the insulating piece and the other opposite the upper section of the spark wire (9). The adjustment system further comprises different elastic washers (19) which, inserted between the two hold-down nuts (17) and the surfaces which they oppose, avoid the threaded joints from loosening. Via this system, the sparks (9) height can be easily adjusted to guarantee the smooth passage of the pantograph and to compensate the possible height differences due to the wear of said elements.

Figure 6:
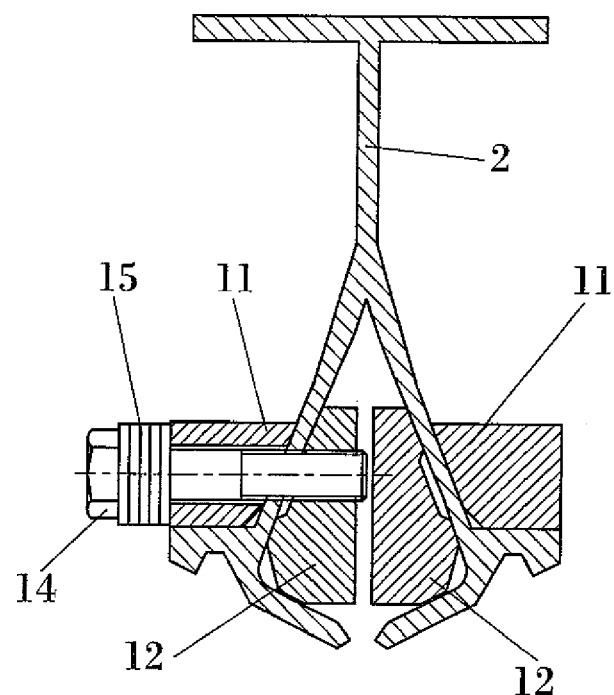
FIG. 6. Shows the section produced by the D-D plane of FIG. 2 and corresponds to the opening mechanism incorporated in the conductor rail segments.

As has been advanced, in order to facilitate the replacement of the spark wires (9), which, as they are the elements wherein the electric arc breaks, are subject to greater wear than that of the other elements constituting the insulator, they join the corresponding conductor rail segment (2) through an opening mechanism, represented in detail in FIG. 6. Said mechanism is basically composed of two side pieces (11), two inner pieces (12) of the same length as the previous, two through-bolts (13) and a central bolt (14).

The two side pieces (11) included in each one of the two opening mechanisms have a configuration such that they adapt to the conductor rail segment (2) by their outer surface, for which reason said configuration will vary depending on the profile of the catenary wherein the insulator is going to be installed. Two inner pieces (12) of equal length to the previous one and opposite them are installed on the inner surface of the conductor rail segment (2). Two through-bolts (13) at each end are bolted to the side pieces (11) and keep the assembly together, whilst the central bolt (14), positioned between the two through-bolts (13), and which, unlike them, is not a through-bolt, abuts against one of the inner pieces (12), its tightening causing the separation of the two lower ends of the profile comprising the conductor rail segment (2) and the consequent opening of the housing wherein the spark wire (9) is inserted, which allows it to be replaced by another one simply. The opening mechanism is completed with a series of washers (15) which, interposed between the head of the central bolt (14) and the side piece (11) wherein said bolt (14) is bolted, prevent the tightening thereof and, therefore, the opening of the housing. Nevertheless, when it is necessary to replace the spark wire (9), said washers (15) should be removed thus enabling the tightening of the central bolt (14), which causes the separation of the lower ends of the conductor rail segment (2). In FIG. 6, which corresponds to the section produced by the D-D plane of FIG. 2, the opening mechanism has been represented in closed state, i.e. with the washers (15) inserted between the head of the central bolt (14) and the side piece (11).

Figure 4:
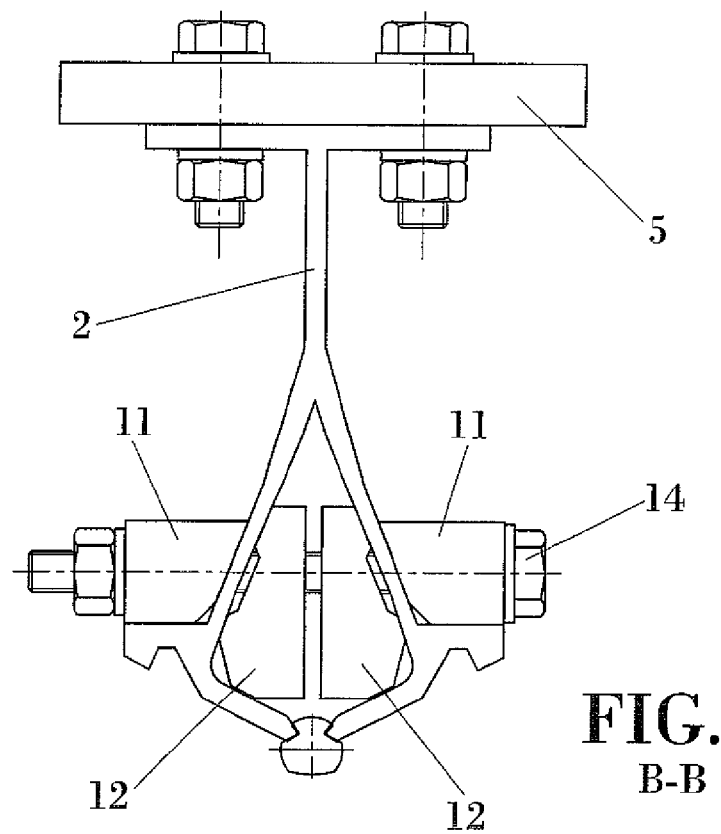
FIG. 4. Shows the section produced by the B-B plane of FIG. 2.
Figure 5:
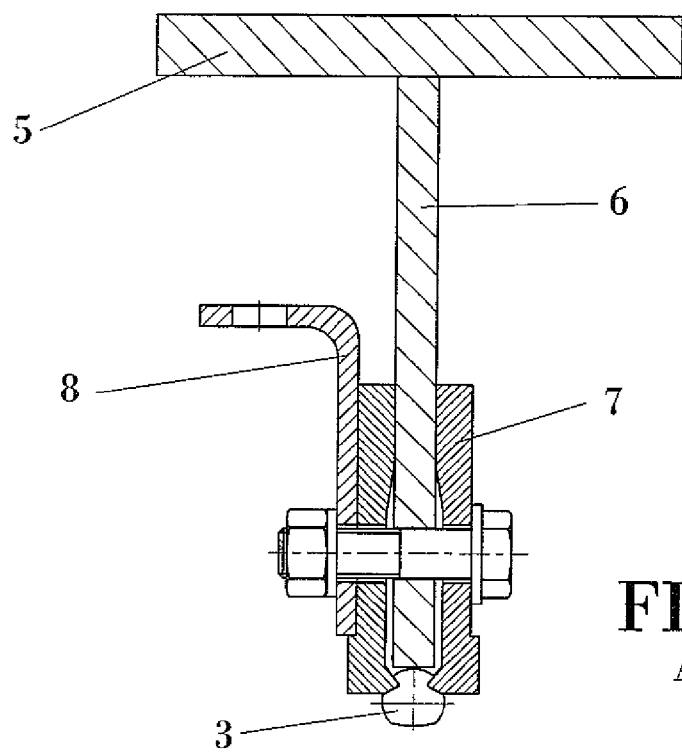
FIG. 5. Shows the section produced by the A-A plane of FIG. 3 and corresponds to the fixing system of the insulator wire to the core of the insulating piece.

The central shoe (1) disposed between both segments (2) is basically comprised of an insulating piece whose cross section is T-shaped, which has a horizontal part, called base (5) and a vertical part or core (6), diagonally disposed. The material comprising this insulating piece can be, for example, resin and fibreglass, although it covers the possibility of using any other material which, having other mechanical properties which are acceptable and suitable for this application, guarantees the required electrical insulation. The oblique arrangement of the core (6) of this insulating piece is observed with greater clarity in FIG. 3, which corresponds to the section produced by the C-C plane of FIG. 2. The joining of this central shoe (1) to the rest of the catenary is performed through the base (5) of the insulating piece, which, as is observed in FIGS. 2 and 4, rests on the conductor rail segments (2) and is bolted to them. The length of the core (6) of this insulating piece is less than that of the base (5), with respect to which it is diagonally disposed thus guaranteeing the symmetry of the assembly. The joining of the insulator wire (3) to said core is performed via a series of clamps (7), as has been represented in FIG. 5, which corresponds to the section produced by the A-A plane of FIG. 3. In said figure we can observe the clamps (7) whereby the insulator wire (3) is fixed to the core (6) of the insulating piece. These clamps (7) have a protuberance on the lower part which perfectly adapts to the grooves of the insulator wire (3). The concave shape of the lower side of the clamps (7) only allows them to come into contact with the core (6) in the upper zone, thus guaranteeing that the clamps (7) firmly secure the insulator wire (3) in the lower zone. The clamps (7) also have a recess on their lower surface designed to house the connecting strips (8) which allows the shoe (1) to be bridged, as has previously been indicated, by a copper bridging cable which extends from said connecting strip (8) to a bore (10) made for said purpose in the conductor rail segment (2) or a connection clamp or similar positioned in the upper part of the adjacent rigid catenary.

The invention claimed is:

1. A section insulator with neutral section for rigid catenary which enables the interruption of continuity of an electric field between two adjacent sections of the catenary on the passage of a pantograph, said insulator comprising two conductor rail segments which can be coupled to a conductor rail of the catenary by connection flanges, said conductor rail having a profile with a lower end, an upper part, an inner surface and an outer surface, wherein said lower end configures a housing;

a central shoe disposed between said two conductor rail segments;

two spark wires, which allow the electric field to be broken, connected to the central shoe by a spark height adjustment system which enables their height to be adjusted; and a bridging means which allows the central shoe to be bridged, thus adjusting the operation of the insulator as section insulator or as neutral section insulator, wherein the central shoe comprises a horizontal base which rests on the upper part of the two conductor rail segments giving continuation to the catenary, and a vertical core oblique to the direction of the catenary, wherein said base incorporates a series of clamps for the fixing of an insulator wire; and wherein the two spark wires extend from the housing of the conductor rail segments and are inserted to the horizontal base of the central shoe, wherein the distance between said two spark wires is greater than the width of the pantograph table to allow the central shoe to behave as a neutral section during the passage of said pantograph, and further wherein each spark wire is joined to the corresponding conductor rail segment through an opening mechanism which comprises:

two side pieces adaptable to the outer surface of said conductor rail segment;

two inner pieces which can be coupled to the inner surface of said conductor rail segment and which are installed opposite the side pieces;

two through-bolts which, bolted to the side pieces, maintain the opening mechanism joined;

a central non-through bolt comprising a head, said central bolt being bolted on one of the side pieces and which abuts against one of the inner pieces, so that its tightening causes the opening of the housing of the conductor rail segment and allows the replacement of the spark wire; and a series of washers which, when interposed between the head of said central bolt and the side piece to which it is bolted, prevent the tightening of said bolt and, therefore, the opening of the housing.

2. The insulator according to claim 1, wherein said bridging means comprises at least one connecting strip disposed on the vertical core of the central shoe, said bridging means allowing the fixing of a bridging cable which extends from said strip, either to a bore made in one of the conductor rail segments, or to a connection clamp positioned on the upper part of the profile of an adjacent rigid catenary.

3. The insulator according to claim 1 wherein said horizontal base of the central shoe comprises an upper surface and a lower surface and wherein the spark height adjustment system comprises:

a bolt comprising a head, a stem and a lower part, wherein said stem traverses the horizontal base of said central shoe and wherein said lower part is housed in an upper end of one of said spark wires;

a washer interposed between the head of said bolt and the upper surface of the horizontal base; and two hold-down nuts threaded on the stem of the bolt and which remain opposite, via different elastic washers, the lower surface of the base and the upper end of the spark wire, respectively.

\* \* \* \* \*